United States Patent
Zegers (12)

(10) Patent No.: US 6,751,601 B2
(45) Date of Patent: Jun. 15, 2004

(54) METHOD AND A SYSTEM FOR SOLVING DYNAMIC PROBLEMS USING THE DYNAMICAL SYSTEM ARCHITECTURE

(76) Inventor: Pablo Zegers, 11750, Casa 14, Lo Barnechea, Santiago, RM (CL), 769-0357

(*) Notice: Subject to any disclaimer, the term of this patent is extended or adjusted under 35 U.S.C. 154(b) by 342 days.

(21) Appl. No.: 09/910,672

(22) Filed: Jul. 20, 2001

(65) Prior Publication Data

US 2002/0032557 A1 Mar. 14, 2002

Related U.S. Application Data

(60) Provisional application No. 60/219,826, filed on Jul. 21, 2000.

(51) Int. Cl.[7] .............................................. G06F 15/18
(52) U.S. Cl. ........................................ 706/16; 706/30
(58) Field of Search ..................................... 706/16, 30

(56) References Cited

U.S. PATENT DOCUMENTS 5,253,329 A * 10/1993 Villarreal et al. ............. 706/31
5,465,321 A * 11/1995 Smyth ......................... 706/20

OTHER PUBLICATIONS

Sundareshan et al, "Recurrent Neural–Network Training by a Learning Automaton Approach for Trajectory Learning and Control System Design", IEEE Transactions on Neural Networks, May. 1988.*

* cited by examiner

Primary Examiner—George B. Davis

(57) ABSTRACT

The invention consists of a learning system (108) based on the Dynamical System Architecture (DSA). Every implementation of the DSA is composed of a dynamic system (112) and a static system (116). The dynamic system (112) generates an intermediate output (114), which together with an external input (100) is fed into the static system (116), which produces a generated output (106). Every time the dynamic system (112) is reset it produces the same trajectory: an intermediate output (114) that does not cross over itself during the temporal span of each of the events generated by a reference system (102) whose behavior has to be duplicated. The static system (116) can be anything that behaves like a trainable universal function approximator. Training uses the intermediate output (114), the external input (100), the observed output (104) produced by the reference system (102) whose behavior is going to be mimicked, and a self-organizing procedure that only modifies the parameters of the static system (116). Training of the dynamic system (112) is not necessary.

18 Claims, 6 Drawing Sheets

METHOD AND A SYSTEM FOR SOLVING DYNAMIC PROBLEMS USING THE DYNAMICAL SYSTEM ARCHITECTURE

CROSS-REFERENCE TO RELATED APPLICATIONS

This application is entitled to the benefit of U.S. Provisional Patent Application serial No. 60/219,826, "Dynamical Function Mapping Using Implementations of the Dynamic System Architecture," filed on Jul. 21, 2000.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

The invention relates to methods and systems for training learning systems that deal with dynamical problems.

Given a reference system that processes an external input $x(t)$ and produces a corresponding observed output $y^*(t)$, the learning problem consists in designing a learning system that adjusts its parameters such that it is capable of processing the same external input $x(t)$ and producing a generated output $y_N(t)$ that is arbitrarily close to the observed output $y^*(t)$ (see FIG. 1).

What makes this problem difficult is that many times nothing is known about the reference system and only samples of the external input $x(t)$ fed into the reference system and the observed output $y^*(t)$ are available.

Generally speaking, the learning problem requires selecting an ensemble of basic building blocks for the learning system, choosing the architecture that connects these elements, designing a learning procedure to adjust the parameters of the ensemble, collecting the samples needed for the self-organizing process, and deciding when learning has to stop.

According to the type of external input and observed output the learning problem can be divided into two main classes: static problems and dynamic problems. Static problems are those where the external input and the observed output do not change in time while the reference system processes the former and generates the latter. Dynamic problems are those in which time does play an essential role: the external input and the observed output can change through time.

Analogously, learning systems can be divided into two categories: static and dynamic systems. Static systems do not have recurrent connections, which is why as long as their input does not change, their output does not change too. They cannot generate dynamic behavior. On the other side, dynamic systems have recurrent connections and can display dynamic behavior even in the absence of inputs.

The previous classifications are relevant if one considers that static problems can be solved using static or dynamic systems, but, dynamic problems can only be solved using dynamic systems.

In order to design systems that learn to deal with static problems, it suffices with designing a static system based on current feed-forward neural network theory. Feed-forward neural networks do not have feedback connections, which is why they are called Non Recurrent Neural Networks (NRNN) in the ensuing description. There are several proofs that ensure the convergence of these neural networks to the desired solutions [1,2,3,4,5,6]. There is a plethora of training methods that produce the desired results in practical amounts of time [5,6,7]. Several refinements have been designed to speed up neural network convergence [8,9,10]. Finally, existing theoretical results allow understanding how the architecture and training of these neuronal assemblies affect their generalization capabilities [6,11]. Despite there is still much work to be done in this field, feed-forward neural network theory provides a solid base that can be used to design practical self-organizing systems that successfully deal with static problems.

There is an enormous interest in discovering ways of designing systems that learn how to deal with dynamical processes just using samples taken from those processes. Welding robots in car-making factories pose a relatively simple problem because their tasks are very structured: the locations at which the welding torches have to be positioned are known a priori. The same is true for all well-defined dynamical problems in robotics and other areas as well. On the other hand, to program a robot that peels a potato with a knife is extremely difficult. Potatoes come in different shapes, the thickness of their skin varies, the quality of the blade of a knife changes through time, etc. The natural variability of the components makes peeling a potato with a knife a very unstructured dynamical problem. Due to this inherent variability the problem is vary difficult to describe, therefore difficult to reduce to formal expressions and solve using some heuristics. The same is true for all highly unstructured problems in robotics and other areas as well. Because formal approaches fail in practice to provide solutions for a potato peeler system, an alternative approach would be to design a self-organizing system that uses samples taken from a person peeling potatoes. The same idea could be used in other unstructured dynamic problems as well.

Two important dynamical problems are trajectory generation and dynamical function-mapping. The trajectory generation problem requires designing a self-organizing system that learns from examples how to duplicate a spatio-temporal trajectory generated by a reference system. The dynamical function-mapping problem is a generalization of the trajectory generation problem: it requires designing self-organizing systems capable of learning how to map a set of spatio-temporal trajectories in some input space to a corresponding set of spatio-temporal trajectory in some output space according to the dynamics dictated by a reference system.

As stated before, current knowledge about static problems allows the design of practical solutions. The same cannot be said about dynamical problems, whose solutions require dynamic systems. In spite of the long lasting effort seen on the automatic control and neural network arenas, there are still no practical solutions for many of the problems of this class. In particular, all the effort spent in developing new Recurrent Neural Network (RNN) architectures, neural networks with feedback connections, and training techniques, has still not produced practical solutions for many of the dynamical problems. Even though it has been proven that a RNN can approximate any known dynamic system [12], despite several techniques for dynamical problems have been developed [13,14,15,16,17], although several optimizations have been done [18,19,20,21,22,23,24], it is still not possible to design RNNs that learn in a practical amount of time to produce random trajectories or map complex spatio-temporal spaces. In many of these cases the solution spaces are plagued with local minima and it is not always possible to find solutions [25]. Gradient descent techniques do not perform very well because gradients tend to vanish as time passes [26]. Non-gradient descent techniques [27,28,29] have been suggested, but their convergence to useful results is not always guaranteed or the time needed to find the solutions grows to impractical lengths. Some techniques work very well [30,31], but how to scale them up to higher dimensional spaces is still unknown. Other techniques work fine in any space, but are limited to tackle static problems [32,33].

Even though some patents address the trajectory generation and dynamic mapping problems, they fall short from giving a full-fledged solution. In [34] the generated output of the learning system is used as external input but nothing is done to guarantee the stability of the system. Reference [35] presents a similar approach where the generated output controls a robotic hand, which sends sensor information back into the inputs as an external input. The difference in this case is that the generated output is riot used as an external input directly, but through the robotic gripper system. In patent [36] the derivatives of the generated outputs are part of the external input but nothing is said about the stability of the problem or the behavior of the system in low signal to noise environments. Reference [37] presents a training method for fully connected RNNs but it does not work very well with simple trajectory generation problems. Patent [38] differs from the previously presented patents in that it uses a probabilistic framework instead of a neural network architecture. But as the previous patents, it also includes the generated output in the external input and ignores the stability issues. Finally, reference [39] presents a method limited to on-line trajectory learning. A common pattern in all these patents is that they either focus on the trajectory generation problem and do not address the dynamical function-mapping problem, or they ignore the stability problem offering partial solutions not guaranteed to work in an arbitrary problem.

Summing up, existing literature and granted patents:

Focus mostly in the trajectory generation problem and do not address the more general case: the dynamical function-mapping problem.

Do not provide a simple and practical solution for dynamical problems in general. Some of the solutions work for simple trajectory generation problems but how they scale to higher dimensionalities is not known. Others provide general solutions but they operation is not very satisfactory.

Most approaches ignore the stability problem and cannot guarantee convergence of the learning systems to a solution. This fact renders most of these approaches useless when it comes to designing all-purpose learning machines.

BRIEF SUMMARY OF THE INVENTION

The invention consists of a learning system based on the Dynamical System Architecture (DSA). Every implementation of the DSA is composed of a dynamic system and a static system. The dynamic system generates an intermediate output o(t), which together with an external input x(t) is fed into the static system, which finally produces a generated output $y_N(t)$. Every time the dynamic system is reset it produces the same intermediate output o(t), which does not cross over itself during the temporal span each of the events generated by a reference system whose behavior has to be duplicated. The static system can be anything that behaves like a trainable universal function approximator. Training uses the intermediate output o(t), the external input x(t), the observed output y*(t) produced by the reference system whose behavior is going to be mimicked, and a self-organizing procedure that only modifies the parameters of the static system. Training of this dynamic system is not necessary.

The invention offers a simple and practical solution for the dynamic problems, specifically for the trajectory generation problem and its generalization: the dynamical function-mapping problem. This learning system is simple, easy to implement using existing techniques, scaling to higher dimensionalities is straightforward compared to other approaches, and provides an excellent performance compared to that offered by the prior art. If a stable dynamic system is used, stability of an implementation of the DSA stops being a concern.

Furthermore, an implementation of the DSA has the additional advantage in that:

It divides the learning system into a dynamic system and a static system, and reduces the problem to training a static problem.

The same dynamic system can be used for all the dynamical problems, which means that the dynamic system can be previously synthesized. This makes unnecessary to train the dynamic system.

The conditions imposed on the dynamic system by the DSA architecture make possible to choose very simple dynamic systems.

There are several alternatives for implementing the dynamic system: software routines, differential equation systems, RNNs, specific hardware, physical systems, etc. The dynamic system is not constrained to be a RNN or some probabilistic framework as it is in the prior art.

Any universal function approximator architecture can be used for the static system. The DSA does not require any of these in special: any of them is equally suitable.

The fact that the dimensionality of the external input and the generated output only affects the static system implies that scaling an implementation of the DSA to higher dimensionalities is much simpler than doing it with an arbitrary RNN.

The absence of feedback going from the static system to the dynamic system implies that if a stable dynamic system is synthesized, the learning system is inherently stable.

There are many training approaches that can be used with an implementation of the DSA: it is just matter of choosing some universal function approximator architecture and the corresponding training procedure.

Further objects and advantages of the invention will become more clear after examination of the drawings and the ensuing description.

Figure 1:
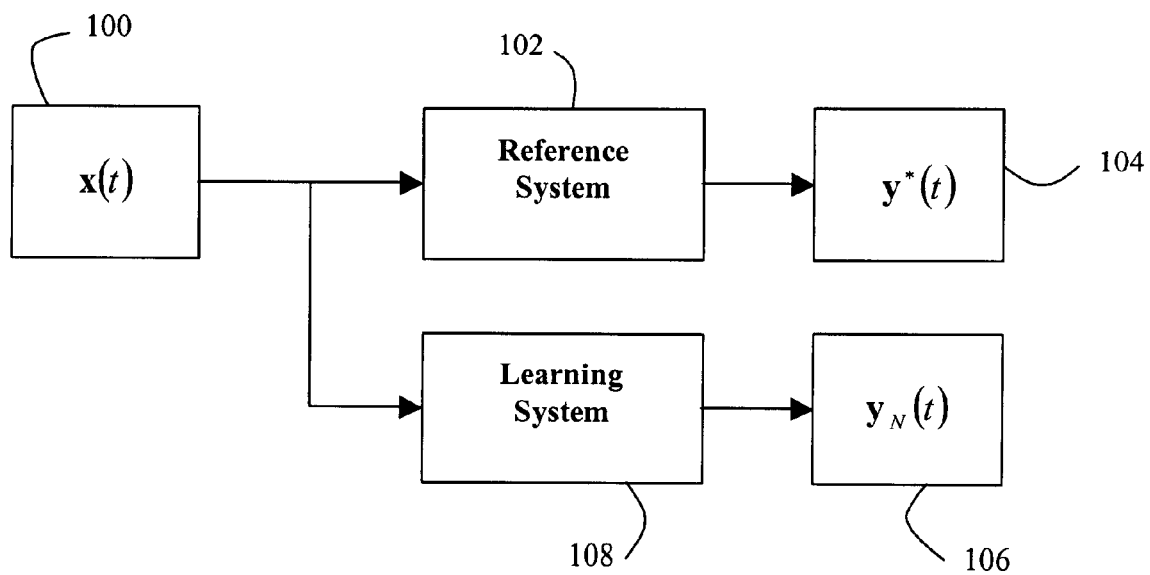
FIG. 1 illustrates the relation between external input x(t), reference system, learning system, observed output y*(t), and generated output $y_N(t)$ in a learning system problem.

REFERENCE NUMERAL IN DRAWINGS 100 external input
102 reference system
104 observed output
106 generated output
108 learning system
110 reset signal
112 dynamic system
114 intermediate output
116 static system

DETAILED DESCRIPTION OF THE INVENTION

Intuitive Presentation of The Ideas Underlying The Invention

The invention is based on two insights:

The first insight is that it is always possible to map a time varying trajectory with bounded temporal span into an arbitrary trajectory with the same temporal span using a point by point mapping. In this case the time varying is like a rope lying on the ground, and the point-by-point mapping is like somebody that rearranges the rope into a different shape.

The second insight is that most of the trajectory generation and dynamical function-mapping problems deal with reference systems that produce time-bounded events where the information about the instant these events start to happen and their temporal span is available. For example, every time a person makes a sandwich, it is easy to determine when each of these events started and how long they lasted. The same can be done with many events generated by people, animals, machines, and all sorts of physical phenomena. If a learning system is trained to reproduce the dynamics of these reference systems it will necessarily deal with time-bounded events that start in known moments of time. If samples of time-bounded events with known starting point are taken, it is possible to obtain a set of data triplets $(t_i, x_i, y^*_i)$, $i \in [1,N]$, where $t_i$ measures the temporal spanned since the event from which the sample is being taken started and the instant in which the sample was taken, $x_i$ is a vector that represents the external input going into the reference system at $t=t_i$, and $y^*_i$ is a vector that represents the observed outputs coming out from the reference system at $t=t_i$.

Using these two insights it is easy to see that given an arbitrary observed output $y^*(t)$ 104, $t \in [0,T]$, notice the bounded temporal span, it is possible to select an intermediate output $o(t)$ 114, $t \in [0,T]$, equivalent to the rope lying on the ground of the previous example before it is rearranged, and train a universal function approximator, using data triplets obtained from the reference system 102, and implement a function $g_N(\bullet)$ that maps each point of $o(t)$ into a generated output $y_N(t)=g_N(o(t))$ 106 which can be made as close to $y^*(t)$ as desired, the analog to the person that rearranges the rope in the previous example.

The suggestion presented in the previous paragraph can be generalized in order to handle an external input $x(t)$ 100, $t \in [0,T]$. In this case it suffices with implementing a function $g_N(\bullet,\bullet)$ that takes $o(t)$ 114 and $x(t)$ as inputs and maps them into the generated output $y_N(t)=g_N(o(t),x(t))$ 106.

The ideas presented in the previous paragraphs suggest that in order to solve time-bounded dynamic problems, it is enough with generating an intermediate trajectory $o(t)$ 114, and training a universal function approximator using data triplets obtained from the reference system 102 such that a point-by-point mapping $g_N(\bullet,\bullet)$ is obtained.

Theoretical Framework

In a learning problem set up where a reference system 102 processes an external input $x(t)$ 100 and produces a corresponding observed output $y^*(t)$ 104, the learning system 108 has to adjust its parameters such that it is capable of processing the same external input $x(t)$ 100 and producing a generated output $y_N(t)$ 106 that is arbitrarily close to the observed output $y^*(t)$ 104 (see FIG. 1).

Given that the reference process generates several events, it is possible to obtain a set of data triplets $(t_i, x_i, y^*_i)$, $i \in [1,N]$, obtained from the reference system $y^*(t)=f^*(t,x(t))$, where $y^*(t)$ is the observed output 104, $f^*(\bullet,\bullet):\Re^{1+p} \to \Re^m$ represents the reference system 102, and $x(\bullet) \in \Re^p$ is the external input 100. In each data triplet, $t_i$ measures the time between the start of the event from which the triplet was obtained and the instant at which the data triplet was obtained, $x_i$ represents the value of the external input 100 for the corresponding event at $t_i$, and $y^*_i$ represents the value of the observed output 104 for the corresponding event at $t_i$.

Given the conditions presented above:

Theorem #1

The generated output 106 produced by the process $y_N(t)=g_N(o(t),x(t))$, where $y_N(t)$ is the generated output 106, $g_N(\bullet,\bullet):\Re^{k+p} \to \Re^m$ represents the static system 116, $o(t)=h(t)$ an intermediate output 114, $h(t):\Re \to \Re^k$ a dynamic system 112, k some integer, can be made arbitrarily close to $y^*(t)$ 104 as $N \to \infty$, provided that $g_N(\bullet,\bullet)$ is implemented with a universal function approximator with an appropriate VC dimension, $h(t)$ is the dynamic system 112 that implements a one-to-one mapping of the interval $[0,T]$ to $\Re^k$, such that the condition:

$$t_i \neq t_j \to o(t_i) \neq o(t_j) \tag{1}$$

is satisfied, and the static system 116 is trained using the data triplets previously mentioned.

Proof

Given that $y^*(t)=g(o(t),x(t))$, $g(\bullet,\bullet):\Re^{k+p} \to \Re^m$, exists, a universal function approximator with an appropriate VC dimension can implement $y_N(t)=g_N(o(t),x(t))$, $g_N(\bullet,\bullet):\Re^{k+p} \to \Re^m$, where $y_N(t) \to y^*(t)$ as $N \to \infty$ [1,2,3,4,5,6]. In order to make the existence of $g(\bullet,\bullet)$ possible, it suffices with guaranteeing that the condition:

$$y^*(t_i) \neq y^*(t_j) \to o(t_i) \neq o(t_j) \forall t_i \neq t_j \in [0,T] \tag{2}$$

is satisfied. This condition implies that two distinct points in the $y^*(t)$-space need to be related to two distinct points in the $o(t)$-space. Any dynamic system that implements a one-to-one mapping of the interval $[0,T]$ to $\Re^k$ such that the condition $t_i \neq t_j \to o(t_i) \neq o(t_j)$, where $t_i, t_j \in [0,T]$, is satisfied, necessarily produces an output in the $o(t)$-space that satisfies the condition stated in eqn. (2).□

Figure 2:
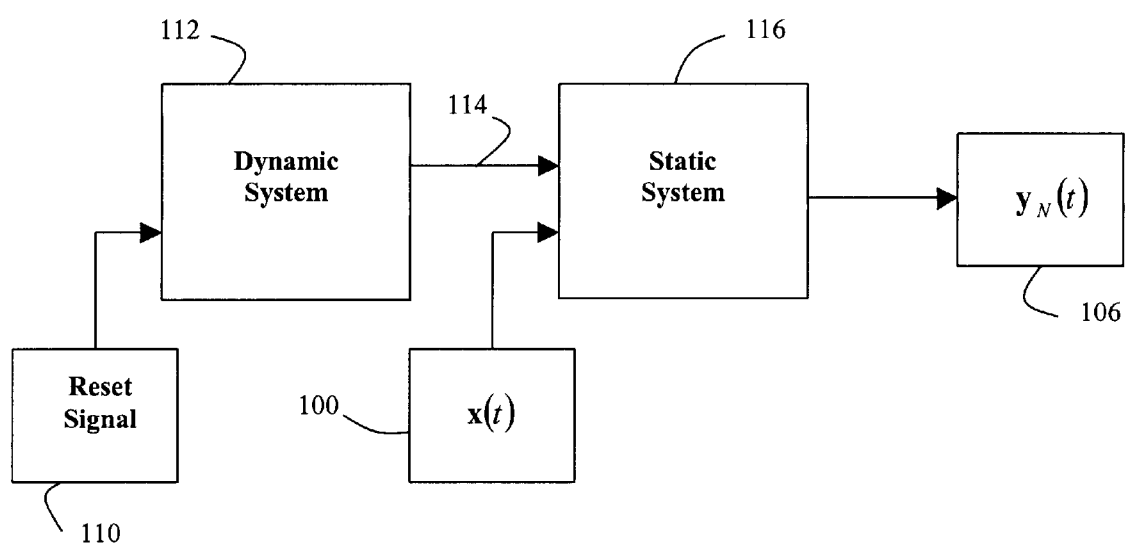
FIG. 2 depicts the Dynamic System Architecture (DSA).

Thence, any dynamical function-mapping problem that deals with time-bounded dynamic events can be solved using two cascaded processes: a first one that produces the trajectory $o(t)$ 114 using the mapping $h(t)$ 112, and a second that maps the trajectories $x(t)$ 100 and $o(t)$ 114 into the generated output $y_N(t)$ 106 using $g_N(\bullet,\bullet)$ 116. This produces a natural division of labor where $h(t)$ 112 controls the temporal aspects of the output, and $g_N(\bullet,\bullet)$ 116 controls the spatial ones. This architecture is called the Dynamic system architecture (DSA) (see FIG. 2).

One advantage of the implementations of the DSA is that the requirements for $h(t)$ are the same for all the dynamic problems, which makes possible to use the same dynamic system for all these problems. Therefore, it is possible to synthesize a simple dynamic system and use it for all existing bounded-time dynamic problems. This characteristic of the DSA architecture makes unnecessary to train dynamic systems, which is precisely what has been proven difficult and a problem for which no satisfactory solution has been found so far. Also, as long as an implementation of the DSA complies with the conditions specified in theorem #1, the dynamic system that implements the mapping o(t)=h(t) can be chosen as simple as wanted irrespective of the complexity of the observed trajectory y*(t). In a DSA implementation there is no feedback going from the static system into the dynamic system, so stability problems are confined to the dynamic system. If a stable and robust system is synthesized, stability stops being a concern.

Another advantage of this architecture is that the mapping y*(t)=g(o(t),x(t)) can be approximated by $y_N(t)=g_N(o(t),x(t))$ using any trainable universal function approximator. Given that there is no need of training a dynamic system because it can be synthesized, in a DSA implementation only the static system needs to be trained. This reduces the time-bounded dynamic problems to a simpler static problem, for which many practical techniques are currently available.

The Invention

The learning system consists of a learning system 108 based on the DSA:

Given a reference system 102, represented by f*(•,•), $f^*(•,•):\Re^{1+P}\to\Re^m$, that processes an external input $x(•)\in\Re^P$ 100, and produces a corresponding observed output y*(t)=f*(t,x(t)) 104, it is possible to obtain a set of data triplets $(t_i,x_i,y^*_i)$, i∈[1,N], where $t_i$ measures the time between the start of the event from which the triplet was obtained and the instant at which the data triplet was obtained, $x_i$ represents the value of the external input 100 for the corresponding event at $t_i$, and $y^*_i$ represents the value of the observed output 104 for the corresponding event at $t_i$.

The dynamic system 112 of an implementation of the DSA has inputs and generates an intermediate output o(t) 114. When the dynamic system 112 is reset, it starts to generate the intermediate output o(t) 114 as if t=0. The intermediate output 114 of the dynamic system 112 complies with the condition stated in eqn. 1, meaning that the trajectory does not repeat itself within the temporal span of the events produced by the reference system 102. These are the only requirements for the dynamic system 112, and anything that complies with them is a suitable dynamic system 112.

The inputs of the static system 116 of the implementation of the DSA are the intermediate output o(t) 114 and external input x(t) 100. The output of the static system is the generated output $y_N(t)$ 106. The static system 116 needs to be a universal function approximator with an appropriate VC dimension.

Finally, the parameters of the learning system 108 are modified using the modified data triplets $(o(t_i),x_i,y^*_i)$, i∈[1,N], where o(0) corresponds to the value of the intermediate output 114 in a reset instant, and a learning procedure that only affects the static system 116. Once the generated output $y_N(t)$ 106 is as close as desired to y*(t) 104, the learning system 108 can be used for whatever purposes it was designed.

It is important to point out that even though the previous paragraph gives the impression of being a sequential, discrete, and off-line training procedure, a parallel, continuous, and on-line (or other combinations of these characteristics) training process could be implemented too. The previous description has to be understood as a guideline to be used in the design of any possible training procedure.

Embodiments

The different embodiments that follow reflect some of the different ways in which the dynamic system and the static system can be implemented. They also reflect the existing alternatives for training static systems that behave as universal function approximators.

The dynamic system can be implemented:

Using a digital computer and the appropriate software to produce an output that complies with the condition expressed in eqn. 1. An example would be a computer program that produces a monotonic trajectory that lasts more than the temporal span of the events produced by the reference system. Another example optimized for cyclic behavior would be a subroutine that produces the circular trajectory:

$$o(t) = \left(\sin\frac{2\pi}{T}t, \cos\frac{2\pi}{T}t\right), t \in [0, T].$$

In a digital environment, this is the preferred embodiment due to its simplicity. The dynamic system could also be implemented using a RNN designed to generate monotonic behavior or limit cycles. A popular model for RNNs is the continuous time model described by the following set of nonlinear differential equations:

$$\frac{1}{\tau_i}\frac{dx_i(t)}{dt} = -x_i(t) + \sum_{j=1}^{M} w_{ji}f_i(x_j(t-d_j)) + b_i, i \in [1, \ldots, N] \quad (3)$$

where $\tau_i\in\Re$ defines the speed of the dynamics of the RNN, $x_i(t)$ denotes the state of the $i^{th}$ neuron in instant t, $\omega_{ji}\in\Re$ denotes the interconnection weight from the $j^{th}$ neuron into the $i^{th}$ one, $f_i(•)$ defines the squashing function of the $i^{th}$ neuron, $d_j$ defines the delay in the output of the $j^{th}$ neuron, $b_i$ sets the bias of the $i^{th}$ neuron, and M is the number of neurons of the RNN. In this work the threshold function is defined as:

$$f_i(z) = \frac{2}{1+e^{-a_i z}} - 1, i \in [1, \ldots, M] \quad (3)$$

where $\alpha_i\in\Re$ is used to adjust the shape of the threshold function. The RNN can be simulated in a computer using numerical algorithms for sets of differential equations.

Using discrete or analogous hardware that produces an output that complies with the condition expressed in eqn. 1. The same examples mentioned in the previous point also apply here. The only difference is that now the algorithms are implemented directly in hardware.

Thinking in more general terms it is easy to see that any physical system that produce monotonic behavior, as any accumulator would do, or stable limit cycles, like sets of out-of-phase pendulums or natural harmonic oscillators, could be used as a dynamic system. The same is true with RNNs: a physical system that is represented by differential equations functionally equivalent to those that define a RNN designed to work as a dynamic system can also be used as such.

The static system can be anything that behaves like a universal function approximator. The simplest way of implementing something with this type of behavior is using a NRNN. Any feed-forward neural network based on a multilayer perceptron architecture, a radial basis function approach, a support vector machines, or other neural network architectures complies with this requirement. The techniques needed to implement any these solutions are widely known in the neural networks arena. As with the dynamic system, the NRNN can be implemented in a computer and simulated using specifically dedicated software. It can also be implemented using specifically designed hardware. Also, variants of the static system can be generated adding delays to the external input, which allows integrating the past into the present. In a digital environment the preferred embodiment is the multiplayer perceptron.

Different dynamic system and static system embodiments can be used, and depending on the case digital to analog or analog to digital converters may be needed. For example, if a physical system is used to generate a limit cycle, and a multiplayer perceptron simulated in a digital computer is used to implement the universal function approximator, analog to digital converters would be needed to interface the dynamic system with the static system.

Finally, adjusting of the parameters of the system can be done using any training approach for universal function approximators. Some of the current available techniques are the multiplayer perceptron's backpropagation, radial basis function approximator's training, different support vector machine training approaches, etc. It is important to notice that even though training of the system has been explained using discrete samples taken from the events, nothing stops the learning system from use continuous streams of data.

EXAMPLE 1

Figure 3:
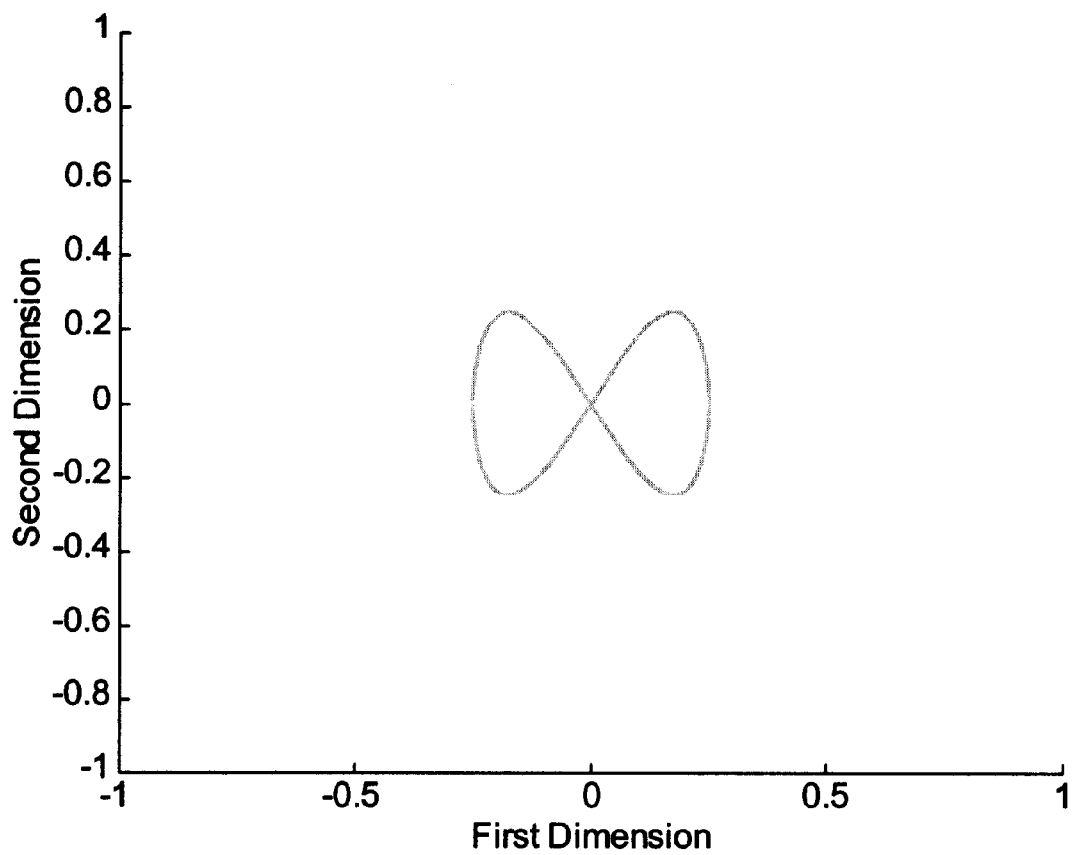
FIG. 3 shows an observed output that follows an "eight" pattern in the state space. It also the generated output produced by the learning system after it is trained using the observed output.

This example shows how to generate a trajectory shaped as the number eight. This problem has become a benchmark against which solutions for the trajectory generation problem have been traditionally tested. The difficulty encompassed by this problem lies in its crossover point, which corresponds to a many-to-one mapping. A set of data triplets was collected as the reference system produced one cycle and produced the number eight. The dynamic system was implemented using a routine that generated a perfect circle. The NRNN was implemented using a multilayer perceptron with two inputs, one hidden layer with four neurons, and an output layer with two neurons. Both, the dynamic system and the NRNN, were implemented in software. Training was done using the fastest training algorithms for multiplayer perceptrons available in the Matlab package. The time needed to train the system was almost negligible. The disparity between the reference trajectory and the generated trajectory was negligible. 100 cycles of the generated output are shown in FIG. 3.

EXAMPLE 2

Figure 4:
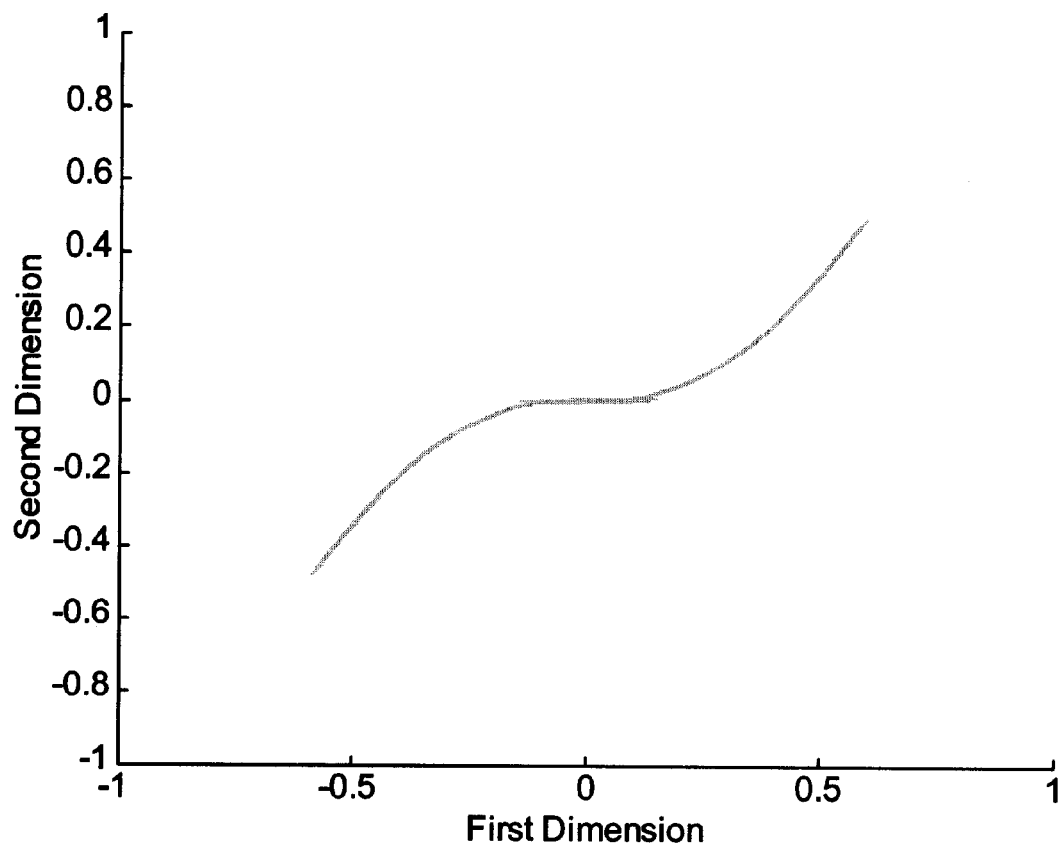
FIG. 4 shows an observed output that follows a "snake" pattern with a discontinuity in the space.
Figure 5:
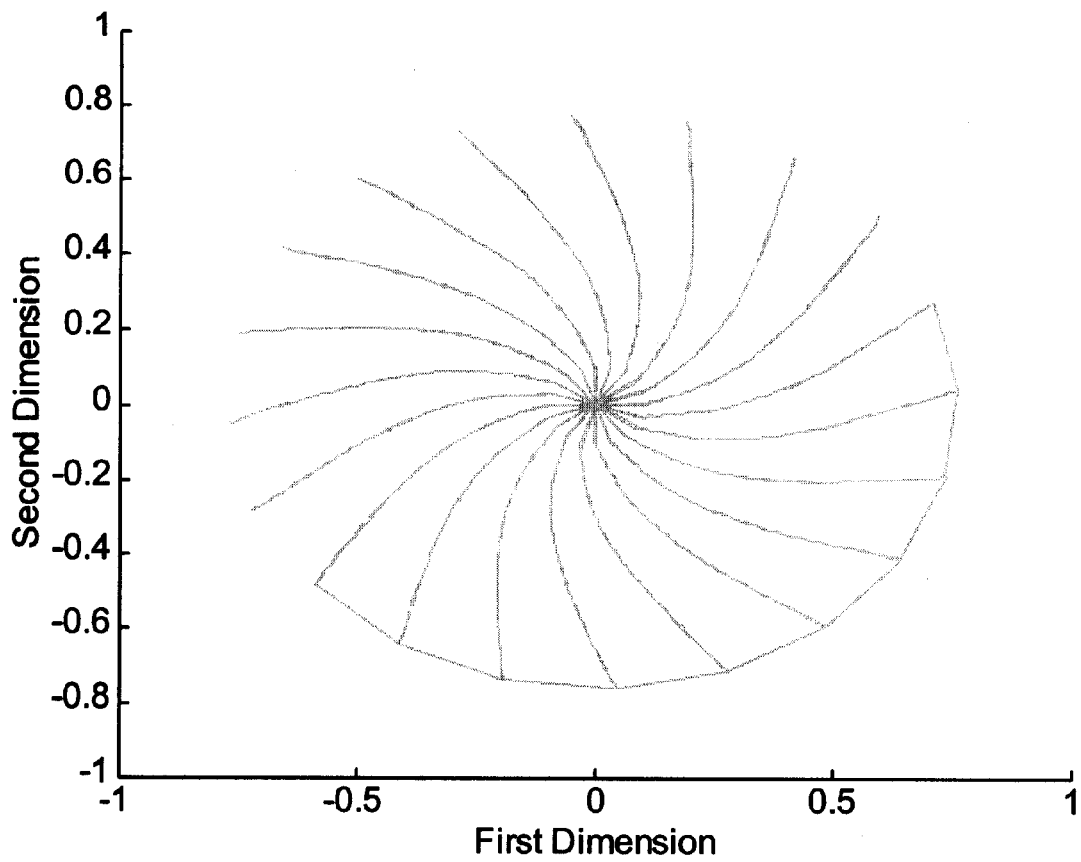
FIG. 5 shows the generated output produced by the learning system after it is trained using served output shown in FIG. 4.
Figure 6:
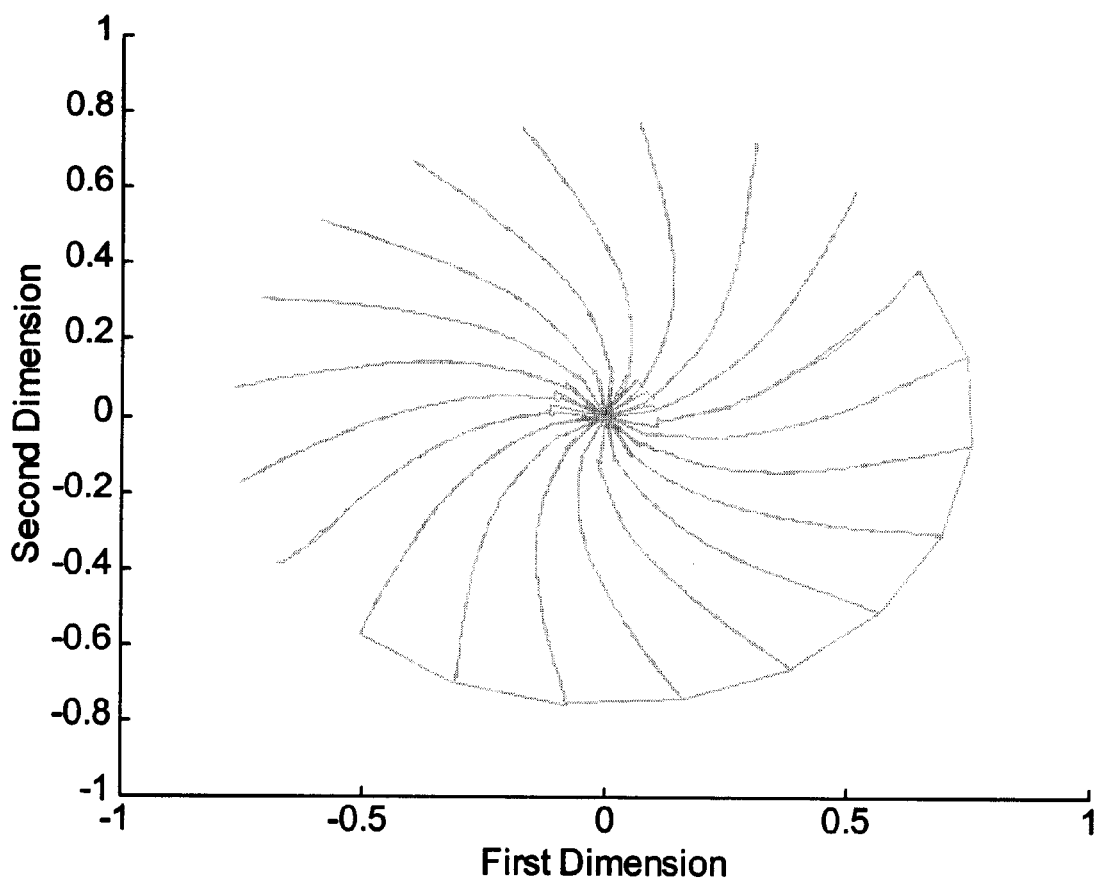
FIG. 6 shows the generated output produced by the learning system when an observed output not used in training the system is applied.

This example consists of generating a "snake-like" trajectory with a sudden spatial transition in its center (see FIG. 4), and controlling the amount of counterclockwise rotation around the point (0.0,0.0) using an external input. The external input ranged from −0.5, which corresponds to 0 degrees of rotation, to 0.5, which corresponds to 180 degrees of rotation, and was held constant while one cycle of the dynamic system was unfolding. In other words, the external input only changed only when the dynamic system started a new cycle. The idea behind this example is to show that the dynamics of the trajectory can be generalized for different rotation angles. A set of data triplets was collected as the reference system produced 10 cycles of the basic trajectory, each of them rotated counterclockwise from 0 to 180 degrees in steps of 18 degrees. The dynamic system was the same used in the previous case. The NRNN was implemented using a multilayer perceptron with three inputs, a first hidden layer with 8 neurons, a second hidden layer with 32 neurons, and an output layer with two neurons. Both, the dynamic system and the NRNN, were implemented in software. Training was done using the fastest training algorithms for multiplayer perceptrons available in the Matlab package. This implementation of the DSA required more training time than that shown in the first example. The error between the reference trajectory and the generated trajectory was negligible. The resulting trajectory is shown in FIG. 5. To test the generalization ability of the DSA, the external signal was set to the equivalent of 9 degrees and kept constant while the dynamic system completed a cycle. The process was repeated increasing the rotation in steps of 18 degrees until the trajectory was rotated 171 degrees. It can be clearly seen that the DSA correctly generalized the problem (see FIG. 6).

Applications

Two important applications of implementations of the DSA are:

A learning machine designed to generate synthetic actors for movies or computer games. A 3D imaging system could be used to capture the movements of a person interacting within a certain environment. An implementation of the DSA could be trained using the captured data triplets to learn the dynamics associated to all sorts of periodical movements, like running or walking, and non-periodical movements, like tying shoelaces. The resulting learning system could be used to generate synthetic representations of movements done by that person. Even more, thanks to the generalization capabilities of the system, it would be possible to produce synthetic representations of movements not captured in the data triplets. In other words, to generate synthetic representations of movements not done by the person but perfectly consistent with the way that person moves. Such a system could be used to produce synthetic actors or in computer games to produce realistic interactions between artificial characters.

A system similar to the one presented in the previous application could be used to produce reference trajectories for an anthropomorphic robot. As an example, the learning machine of the previous application would know where all the joints have to be and how the limbs have to move in order to execute a certain task. This reference trajectory can be used to control the robot and make it perform any physical task a human being can do.

The previous two examples of applications are not exhaustive, and there many other possible uses of the techniques previously explained.

Conclusions, Ramifications, and Scope

The learning system offers a simple and very practical solution for dynamic problems, including trajectory generation and dynamical function-mapping problems. It is a simple solution, easy to implement, scaling to higher dimensionalities is straightforward, and provides an excellent performance when it is compared to the prior art. Operation of the learning system is further simplified by the fact that the DSA architecture permits solving the stability problem in a trivial manner. Furthermore, implementation of the DSA has the additional advantages in that:

Dividing the learning system into a dynamic system and a static system effectively reduces the problem to training a static problem.

The same dynamic system can be used for all the dynamical problems, which means that the dynamic system can be previously synthesized. This makes unnecessary to train the dynamic system.

The conditions imposed on the dynamic system by the DSA architecture make possible to choose very simple dynamic systems.

There are several alternatives for implementing the dynamic system: software routines, differential equation systems, RNNs, specific hardware, physical systems, etc.

Different universal function approximators architectures can be used for the static system. The DSA does not require one of these in special.

The fact that the dimensionality of the external input and the generated output only affect the static system implies that scaling the approach to higher dimensionalities is much simpler that doing it so with a learning system with recurrent connections.

The absence of feedback going from the static system to the dynamic system implies that if a stable dynamic system is synthesized, the learning system is inherently stable.

There are many training approaches that can be used with an implementation of the DSA: it is just matter of choosing some universal function approximator architecture and a corresponding training procedure.

See reference [40] for another explanation of some of the ideas underlying this learning system.

While there has been shown and described what is considered to be preferred embodiments of the learning system, it will be understood that various modifications and changes in form or detail could readily be made without departing from the spirit of the invention. It is therefore intended that the invention be not limited to the exact forms described and illustrated, but should be constructed to cover all modification that may fall within the scope of the appended claims. Accordingly, the scope of the invention should be determined not by the embodiments illustrated, but by the appended claims and their legal equivalents.

I claim:

1. A method for designing a learning system comprising:
   obtaining a plurality of samples from a plurality of time bounded events generated by a reference system, where said samples characterize the amount of time passed since corresponding said time bounded event started and corresponding said sample was taken, characterize a corresponding external input going into said reference system when corresponding said sample is taken, and characterize a corresponding observed output coming from said reference system when corresponding said sample is taken;
   implementing a dynamic system such that after it is reset it always produces a same intermediate output, where said intermediate output does not repeat itself within the temporal span of the events produced by said reference system;
   implementing a static system, whose inputs comprise said intermediate output and said external input, whose output is a generated output; and
   modifying the parameters of said static system using said samples and a training procedure, such that said generated output converges to said observed output produced by said reference system;
   whereby said learning system is able to produce said generated output arbitrarily close to said observed output when both said learning system and said reference system use the same said external input as input.

2. The dynamic system of claim 1 wherein it is implemented using a computer and an appropriate computer program that produces a monotonic trajectory.

3. The dynamic system of claim 1 wherein it is implemented using a computer and an appropriate computer program that simulates a recurrent neural network.

4. The dynamic system of claim 1 wherein it is implemented in digital hardware.

5. The dynamic system of claim 1 wherein it is implemented in analog hardware.

6. The dynamic system of claim 1 wherein it is implemented using a physical system.

7. The static system of claim 1 wherein it is implemented using a multilayer perceptron architecture.

8. The static system of claim 1 wherein it is implemented using a radial basis function architecture.

9. The static system of claim 1 wherein it is implemented using a support vector machine.

10. A system for designing a learning system comprising:
    means for obtaining a plurality of samples from a plurality of time bounded events generated by a reference system, where said samples characterize the amount of time passed since corresponding said time bounded event started and corresponding said sample was taken, characterize a corresponding external input going into said reference system when corresponding said sample is taken, and characterize a corresponding observed output coming from said reference system when corresponding said sample is taken;
    means for implementing a dynamic system such that after it is reset it always produces a same intermediate output, where said intermediate output does not repeat itself within the temporal span of the events produced by said reference system;
    means for implementing a static system, whose inputs comprise said intermediate output and said external input, whose output is a generated output; and
    means for modifying the parameters of said static system using said samples and a training procedure, such that said generated output converges to said observed output produced by said reference system;
    whereby said learning system is able to produce said generated output arbitrarily close to said observed output when both said learning system and said reference system use the same said external input as input.

11. The means for implementing a dynamic system of claim 10 wherein they include a computer and an appropriate computer program that produces a monotonic trajectory.

12. The means for implementing a dynamic system of claim 10 wherein they include a computer and an appropriate computer program that simulates a recurrent neural network.

13. The means for implementing a dynamic system of claim 10 wherein they include digital hardware.

14. The means for implementing a dynamic system of claim 10 wherein they include analog hardware.

15. The means for implementing a dynamic system of claim 10 wherein they include a physical system.

16. The means for implementing a static system of claim 10 wherein they include a multilayer perceptron architecture.

17. The means for implementing a static system of claim 10 wherein they include a radial basis function architecture.

18. The means for implementing a static system of claim 10 wherein they include a support vector machine.

* * * * *